Feb. 7, 1967 C. F. CHUBB 3,303,497
TIME EXPANSION RADAR
Filed March 28, 1963
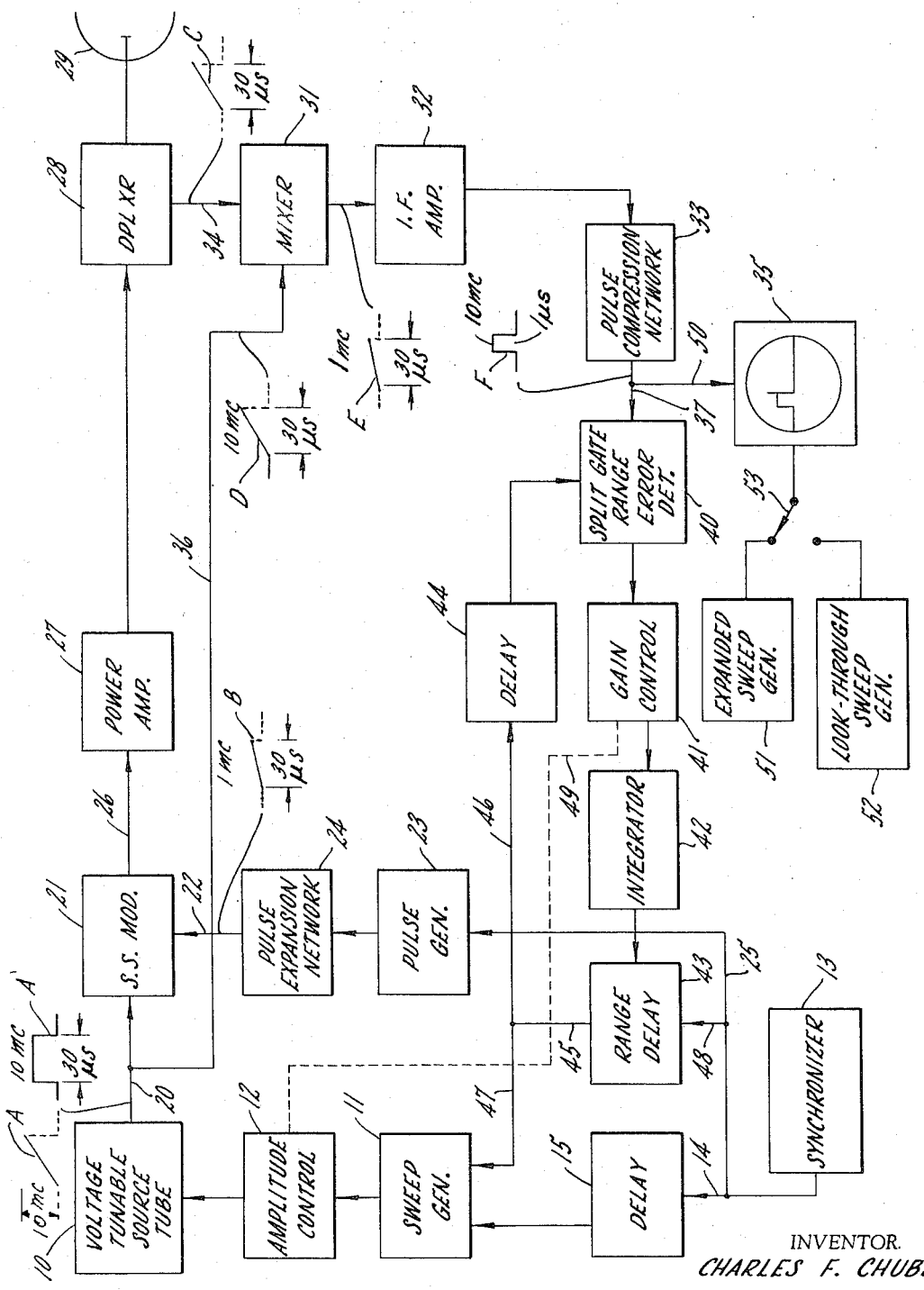
INVENTOR.
CHARLES F. CHUBB
BY
H. H. Losch
ATT'YS.

United States Patent Office 3,303,497
Patented Feb. 7, 1967

3,303,497
TIME EXPANSION RADAR
Charles F. Chubb, Glen Head, N.Y., assignor, by mesne assignments, to the United States of America as represented by the Secretary of the Navy
Filed Mar. 28, 1963, Ser. No. 269,238
9 Claims. (Cl. 343—7.3)

This invention relates to range tracking radar and more particularly to the technique of combining pulse compression and frequency comparison radar circuits to provide a radar system of high range resolution.

In prior known radar ranging devices range resolution has been improved in one radar ranging type by pulse compression and in another radar ranging type by employing frequency comparison or frequency modulation. Both of these techniques have been successfully employed as separate radar systems, but it is believed that frequency comparison has only been used in tracking radars while pulse compression has been used in both search and tracking radars.

In the present invention pulse compression and frequency comparison radar circuitry are combined in a cooperative and coactive manner in a range tracking radar system. By the combination so taught in this invention a range tracking radar is developed to achieve very good and high resolution display in the space immediately adjacent the target being tracked. For some applications the combined pulse compression and frequency comparison in a single radar has the disadvantage of requiring a relatively wide-band pulse-compression network not fully matched over the bandwidth of the return or echo signal. However, the combination of pulse compression and frequency comparison in range tracking radar applications is of value in providing a time or range expansion radar system with high target range resolution. In this invention a voltage tunable source tube, such as a magnetron tube, is controlled by a sweep generator to develop a linear sweep of about ten megacycles during a thirty microsecond period. This carrier is single-side-band modulated (i.e., shifted in frequency) by an intermediate frequency pulse generated and expanded to thirty microseconds for a frequency sweep of one megacycle. The echo pulses are mixed in a mixer of the receiver channel having an intermediate frequency network and a pulse compression network interconnecting the range tracking circuit. The output of the range tracking circuit triggers the sweep generator to produce another frequency sweep identical to that generated for the transmitted signal, and this latter signal is mixed with the received echo signal. If the two signals do not coincide in time, the tracking circuits automatically advance or retard the tracking circuit triggered frequency sweep pulse to cause coincidence of the secondary sweep and the echo signal. This provides high resolution display of targets located in the vicinity of the target being tracked by time expansion in the pulse compression circuit for that area of radar illumination. Target indication is provided by coupling the output of the pulse compression circuit to an indicator, such as an A-scope. It is therefore a general object of this invention to provide a high resolution radar ranging system by combining frequency comparison and pulse compression techniques to obtain time or range expansion in the area of the range tracked target.

These and other objects and the attendant advantages and features of this invention will become more apparent to those skilled in the art as the description proceeds when considered along with the accompanying drawing illustrating the invention in block circuit schematic.

Referring more particularly to the drawing, a radar system utilizing pulse compression and frequency comparison techniques is illustrated in block schematic form in which a voltage tunable source tube 10 supplies the pulse source for the transmitted radar signals. The voltage tunable source tube 10 may be a magnetron, or any other suitable device, to produce a sweep of frequency over about a ten megacycle band for a time period of thirty microseconds. The voltage tuning means for the tube 10 is supplied tunable voltage by a sweep generator 11 through an amplitude control means 12 to the voltage tuning means of tube 10. The sweep generator 11 is triggered from a triggering source such as a synchronizer 13 over conductor means 14 through a delay network 15 to the sweep generator circuit 11. Triggering of the sweep generator 11 produces a sweep voltage applicable to the voltage tunable source tube 10 to produce the ten megacycle frequency sweep for a period of thirty microseconds as shown by frequency signal A providing a plot of the frequency sweep in time with respect to frequency. Waveform A′ illustrates A in pulse form. The output 20 of the voltage tunable source tube 10 is applied to a single side-band modulator 21 as one input thereto. A second input to the single side-band modulator 21 is by way of conductor means 22 from a pulse generator 23 through a pulse expansion network 24. The pulse generator 23 is triggered from the synchronizing source 13 by way of the conductor means 25. The pulse generator 23 and pulse expansion network 24 produce a pulse compression sweep frequency voltage of one megacycle over a thirty microsecond time period. The pulse compression sweep frequency voltage is applied over the input 22 to the single side-band modulator 21 and is illustrated in a frequency waveform by B. The delay network 15 provides a time delay in the synchronizer pulses of a fixed amount properly adjusted so that a time relationship of the center of the source tube sweep A and the center of the pulse compression sweep B coincide. The amplitude waveform produced on the output 26 would be a 30 microsecond rectangular pulse. The output of the single side-band modulator is coupled through the conductor means 26 and power amplifier 27 through a duplexer 28 to the radar antenna 29, providing a transmitter channel.

A receiver channel including a mixer 31, an intermediate frequency (IF) amplifier 32, and a pulse compression network 33 are coupled, in that order, from the duplexer output 34 to an oscilloscope indicator 35, such as a high resolution A-scope. Echo pulses received back in the radar antenna 29 are directed over the output 34 of the duplexer 28 to the mixer 31. The output 20 of the voltage tunable source tube 10 is coupled by way of branch conductor 36 as the second input to the mixer 31. The modulated transmitted frequency signals upon scanning a target or target objects will be reflected as echo signals to the mixer 31, one such echo signal for one target being shown by the frequency signal C. The amplitude waveform of the echo signal would be a 30 microsecond pulse similar to the transmitted amplitude signal. Oscillations from the voltage tunable source tube 10, operating as a local oscillator, supply oscillations to the mixer 31, one frequency signal of which is shown by the letter D being a repetition of A. The output of the mixer 31 produces an IF, indicated by the frequency signal E, which is pulse compressed in the pulse compression network 33 from thirty microseconds to one microsecond as shown by the pulse F. The output 37 of the pulse compression network 33 is coupled to a range tracking circuit including a split gate range error detector 40, a gain control 41, an integrator 42, a range delay network 43, and a delay network 44. The elements 40 through 43 are coupled in series to produce a range signal on the output 45 of the range delay network 43, as well understood by those skilled in the range tracking circuit art. The output 45 is coupled by conductor means 46 through the delay network 44 as feedback to the split gate range error detector 40. The split gate range error detector 40 may be of any well-known design for producing early and late gating signals for range tracking a signal such as shown by the pulse F. As well understood by those skilled in the art of range tracking circuits, these circuits will automatically position the early and late gates to maintain the target signal at an intermediate position therebetween. The range tracking output over the conductor 45 is likewise conducted over a branch conductor 47 to the sweep generator 11 to produce the secondary frequency sweep voltage signal D identical to that shown by the signal A on the output 20 of the voltage tunable source tube 10. The output of the synchronizer 13 is applied by way of conductor means 48 to the range delay network 43, in like manner as to the sweep generator 11 and pulse generator 23, to produce a time relationship of the split gate for range tracking to produce the center of the local oscillator or voltage tunable source tube 10 sweep frequency at the center of signal return of the sweep frequency echo signals, such as signal C, as will soon become clear in the description of operation. As will be evident later, any relative range (i.e., time) change between the center of the local oscillator sweep and the center of the target return signals results in an expanded time-delay change of the compressed target signal after its passage through the pulse-compression filter 33. In other words, the range error sensitivity of the signal out of the range error detector 40 is increased by the action of the pulse compression networks in combination with the frequency sweeps of the transmitter source and local oscillator tube 10. The gain control 41 of the output of the range error detector 40 serves to keep the loop gain constant in the range tracking servo for various settings of the sweep amplitude control 12.

The output 37 of the pulse compression network 33 is coupled by a branch conductor 50 to the A-scope 35. The A-scope 35 is driven in horizontal sweep either by an expanded sweep generator 51 or a look-through sweep generator 52 in accordance with the selected position of the single-pole-double-throw switch 53.

*Operation*

In the operation of the device shown in the figure of drawing, when the radar is switched on, the synchronizer circuit 13 produces synchronizing pulses, only one pulse of which will be considered in the function of the several circuits. The synchronizing pulse applied over conductors 14 and 25 will initiate the generation of the sweep voltage in the sweep generator 11 and the pulse voltage in the pulse generator 23. At the same time this synchronizer pulse is conducted over conductor 48 to the range delay network 43 to start the range sweep voltage. The sweep voltage of the sweep generator 11 will cause the voltage tunable source tube 10 to produce a 30 microsecond pulse over a frequency range of 10 megacycles to be applied to the single side-band modulator 21. At the same time the pulse compression sweep signal from the generator 23 will be expanded at the pulse expander 24 to produce a 30 microsecond pulse over a frequency band of one megacycle. The delay 15 is fixed at a predetermined amount such that the signals A and B have their center frequencies coinciding and, further for the purpose of example, let it be assumed that the center frequency of generator 23 is 30 megacycles. Signal B modulates signal A providing a 30 microsecond frequency signal pulse which is transmitted into the atmosphere from the antenna 29. As a target is illuminated, an echo signal, such as the signal C containing the 10 megacycle and the 1 megacycle frequency components, is received in the mixer 31 which is operative through the receiver channel and the range tracking channel to the range delay network 43 establishing a voltage pulse output where the integrated voltage input from the integrator 42 interrupts the voltage sweep of the range delay network. This output from the range delay network 43 is conducted over conductors 45 and 47 to trigger the sweep generator 11 to produce a secondary signal such as D that is conducted by way of the conductor means 36 to mixer 31 for frequency comparison with the received signal C. If the target signal return C coincides in time with the sweep of the local oscillator or voltage tunable source tube 10 providing the secondary signal D, an IF signal of 30 microseconds' duration at a median frequency of 30 megacycles comes out of the mixer as the IF signal E to the IF amplifier 32. This IF still contains the 1 megacycle linear frequency sweep and, because it is centered in frequency at the center of the pulse compression network filter pass band, it will be compressed to 1 microsecond as shown by F. The output of the range delay network 43 is conducted also over conductors 45 and 46 to the split gate range error detector 40 in the tracking circuit to cause the early and late gates to center the compressed echo signal F precisely therebetween, as is well known of such tracking circuits. For a target that is slightly displaced from the range position defined by the center of the 10 megacycle local oscillator sweep signal D, the signal from the mixer 31 will be correspondingly displaced in average frequency just as in any normal frequency comparison radar. Because of the time delay characteristic of the pulse compression filter network 33, such signals will be delayed a lesser or greater amount than the target signal. For example, consider two target objects with a .5 microsecond separation and assume a frequency comparison sweep of 10 megacycles over a 30 microsecond pulse length. The IF signals for targets with such a range separation will differ in frequency by about 0.16 megacycle. In passing through the pulse compression network 33, signals separated by .16 megacycle will experience a time delay difference of 5 microseconds in the compressed output pulses. In other words, a target range separation of .5 microsecond will be expanded to a separation of 5 microseconds in the output signals of the pulse compression network. Since these signals have pulse widths of 1 microsecond, it is apparent that targets which were originally unresolvable in range are now easily resolvable. Actual indications of these target signals can be observed on the A-scope 35 when the switch 53 is connecting the expanded sweep generator 51, which will indicate a range display of only a few hundred yards. When it is desirable to obtain normal range display, the switch is switched to connect the look-through sweep generator, which will provide a range display covering perhaps 20,000 yards. When the switch 53 is in the look-through position, the sweep amplitude control is automatically reduced to zero to remove the sweep voltage and convert the radar to conventional pulse-compression operation. The target selected or tracked from the two targets, as hereinabove referred to, will be tracked in the range tracking circuit to produce a voltage signal in the output 45 and 47 to the sweep generator 11 to produce the sweep signal D applied to the mixer 31 for comparison with the target C selected. The 1 microsecond compressed pulse will be automatically centered in the split gates to produce the range tracking signal on the output 45. The pulse compression network 33 being tuned properly for signals at one center frequency of 30 megacycles and improperly tuned for signals at other frequencies will produce a deterioration in the compressed pulse shape and side-band levels for targets removed in range from the actual target being tracked. This still further improves target resolution of the actual target being tracked. The amplitude control 12 and the gain control 41 in the range tracking circuit may be mechanically coupled or ganged by 49 to maintain constant range-tracking servo loop gain as the sweep amplitude is varied. Control of the sweep amplitude provides means for controlling the range resolution of the radar, the range resolution being directly proportional to the bandwidth of the transmitted signal. In this manner range resolution is time expanded or range expanded to improve target range resolution of a selected target.

While many modifications and changes may be made in the constructional details or structure of the illustrated schematic circuit to arrive at similar results of combining frequency comparison and pulse compression techniques to improve resolution, it is to be understood that I desire to be limited only by the scope of the appended claims.

I claim:

1. A time-range expansion radar combining pulse compression and frequency comparison techniques comprising:
   a voltage tunable source tube having an output;
   a sweep generator coupled to said voltage tunable source tube for controlling the latter to produce a sweep of frequency oscillations;
   a modulator coupled to said voltage tunable source tube for modulating said sweep of frequency oscillations;
   a duplexer;
   a transmitter channel and receiver channel coupled through said duplexer, said transmitter channel being coupled to said modulator to transmit said modulated sweep of frequency oscillations;
   a range tracking circuit having an output;
   a mixer, an intermediate frequency circuit, and a pulse compression circuit in said receiver channel in series from said duplexer to said range tracking circuit, the range tracking circuit output being coupled to said sweep generator to cause said sweep generator to produce a sweep of frequency oscillations upon the occurrence of an echo of said transmitted frequency oscillations; and
   means coupling the voltage tunable source tube output to said mixer to mix said frequency oscillations produced from said range tracking circuit output and said echo frequency oscillations to compare the two frequency signals and to pulse compress the mixed frequency for application to said range tracking circuit whereby a high resolution of a tracked target is accomplished.

2. A time-range expansion radar combining pulse compression and frequency comparison techniques comprising:
   a sweep generator;
   a radar system for transmitting and receiving sweep frequency pulses including a voltage tunable source tube having an output controlled in frequency sweeps by said sweep generator and modulated by pulses of finite duration;
   a range tracking circuit having an output;
   a receiver channel including a mixer, an intermediate frequency network, and a pulse compression circuit with an output coupled to said range tracking circuit, the output of said range tracking circuit being coupled to said sweep generator to cause said voltage tunable source tube to produce secondary sweep frequencies, said voltage tunable source tube output being coupled to said mixer to produce frequency comparison of the echo and secondary sweep frequency signals; and
   an indicator coupled to the output of said pulse compression circuit to indicate the target being tracked whereby the target tracking circuit causes frequency sweep signals to be produced for comparison with the corresponding echo frequency sweep pulse and pulse compression of the resultant frequency signal for indication by time-range expansion thereby obtaining high resolution of tracked targets.

3. A time-range expansion radar combining pulse compression and frequency comparison techniques comprising:
   a voltage tunable source tube for developing sweep frequency signal pulses on an output thereof;
   a sweep generator having an amplitude control in an output thereof coupled to tune said voltage tunable source tube;
   an antenna;
   a modulator and a duplexer coupled in that order from said voltage tunable source tube output to said antenna for transmitting said frequency signal pulses;
   a pulse generator for generating pulse compression signal pulses coupled to said modulator for modulating said frequency signal pulses;
   synchronizing means coupled to said sweep generator and said pulse generator to synchronize the development of the sweep and pulse compression signal pulses;
   a receiver channel including a mixer and an intermediate frequency amplifier therein coupled to said duplexer to receive echo frequency signal pulses;
   a range tracking circuit having an output coupled to said sweep generator to trigger said sweep generator to produce a sweep voltage to cause said voltage tunable source tube to produce a secondary frequency signal pulse similar to the transmitted frequency signal pulse;
   means coupling said voltage tunable source tube output to said mixer to effect mixing comparison of each said secondary frequency signal pulse with said echo frequency signal pulse;
   a pulse compression circuit having an input coupling said receiver channel and an output coupling said range tracking circuit for compressing said echo frequency signal at a predetermined frequency and providing time expansion of echo frequency signals displaced from said predetermined frequency; and
   an indicator coupled to the output of said pulse compression circuit to indicate target range whereby frequency comparison of target echos with secondary frequency signals and pulse compression of the targets echo signals produce high range resolution of target objects being tracked.

4. A time-range expansion radar as set forth in claim 3 wherein
   said range tracking circuit includes a split gate range error detector, a gain control, an integrator, and a range delay providing said range tracking circuit output, said range tracking circuit output being fed back to said split gate range error detector to produce automatic tracking control of the pulse compressed and applied from said pulse compression circuit.

5. A time-range expansion radar as set forth in claim 4 wherein
   said coupling of said synchronizing means to said sweep generator includes a delay network and said coupling of said pulse generator to said modulator includes a pulse expansion network to produce coincidence in time of each sweep frequency signal and pulse expanded signal in said modulator.

6. A time-range expansion radar as set forth in claim 5 wherein
   said amplitude control in said output of said sweep generator is coupled to said gain control in said range tracking circuit to produce variable range resolution and suitable control of range-servo gain and bandwidth.

7. A time-range expansion radar combining pulse compression and frequency comparison techniques comprising:
   a voltage tunable source tube for developing sweep frequency signal pulses on an output thereof;
   a sweep generator having an output coupled to tune said voltage tunable source tube in the production of said sweep frequency signal pulses;
   a modulator coupled to receive said sweep frequency signal pulses of said voltage tunable source tube to produce modulated signals on an output thereof;
   a pulse generator and a pulse expansion network coupled in that order to said modulator to produce expanded pulse compression sweep frequency pulses for modulating said sweep frequency signal pulses;

a synchronizing means coupled to said sweep generator and to said pulse generator to synchronize the generation of said sweep frequency signal pulses and said expanded signal pulses, said coupling between said synchronizing means and said sweep generator including a delay network to effect coincidence of each sweep frequency pulse signal with a corresponding expanded pulse signal to said modulator to produce modulated sweep frequency signals;

an antenna;

a receiver channel;

a duplexer coupling said modulator to said antenna for transmitting said modulated sweep frequency signal pulses, and said duplexer further coupling said receiver channel to direct received echo signals into said receiver channel;

a mixer, an intermediate frequency amplifier, a pulse compression network, and an oscilloscope indicator in said receiver channel, said pulse compression network having an output coupling said oscilloscope indicator and being response to a predetermined intermediate frequency to cause time expansion of pulses displaced from said predetermined intermediate frequency;

a range tracking circuit coupled to said receiver channel at the output of said pulse compression network to track said echo signals, said range tracking circuit having an output coupled to said sweep generator to cause said voltage tunable source tube to produce a second sweep frequency signal pulse for each echo signal; and means coupling the output of said voltage tunable source tube to said mixer to apply said secondary sweep frequency signal pulses thereto for comparison of frequency with said echo signals thereby producing an interemdiate frequency on an output thereof to said intermediate frequency amplifier whereby echo signals resulting from frequency comparison in said mixer are compressed in said pulse compression network to produce time and range expanded signals for high resolution of the target echos in the area of the target being tracked.

8. A time expansion radar as set forth in claim 7 wherein said oscilloscope indicator is driven by expanded sweep voltages to produce an expanded visible target indication.

9. A time expansion radar as set forth in claim 8 wherein said range tracking circuit includes a split gate range error detector, a gain control, an integrator, and a range delay, in that order, to the output thereof, said output being fed back to said split gate range error detector to produce automatic range tracking of echo target signals, and said sweep generator is coupled to said gain control of said range tracking circuit and operative to control the voltage amplitude on the output of the sweep generator to provide range sensitivity control.

No references cited.

RODNEY D. BENNETT, *Acting Primary Examiner.*

KATHLEEN H. CLAFFY, CHESTER L. JUSTUS,
*Examiners.*

T. H. TUBBESING, *Assistant Examiner.*